United States Patent [19]

Bolus et al.

[11] 3,750,144

[45] July 31, 1973

[54] TRANSCODER FOR DATA EXCHANGES BETWEEN A DELTA MODULATION SYSTEM AND A PCM SYSTEM

[75] Inventors: Daniel Bolus, Vincennes; Claude Paul Henri Lerouge, Maurepas; Marc Andre Regnier, Aulnay-Sous-Bois, all of France

[73] Assignee: International Standard Electric Corporation, New York, N.Y.

[22] Filed: Nov. 26, 1971

[21] Appl. No.: 202,476

[30] Foreign Application Priority Data

Nov. 30, 1970 France .............................. 7042943

[52] U.S. Cl. ...... 340/347 DD, 325/38 B, 179/15 AP

[51] Int. Cl. ................................................ H04l 3/00

[58] Field of Search .............. 340/347 DD, 347 AD, 340/347 DA; 235/154, 155, 92 E X, 165; 328/44; 325/38 R, 38 B; 332/11 D; 179/15 AP, 15 AV, 15 BW

[56] References Cited

UNITED STATES PATENTS

| | | | |
|---|---|---|---|
| 3,296,612 | 1/1967 | Tomozawa | 340/347 AD |
| 3,526,855 | 9/1970 | McDonald | 332/11 D |
| 3,588,364 | 6/1971 | Wallingford et al. | 325/38 B |
| 3,686,631 | 8/1972 | Elliott | 325/38 B |

*Primary Examiner*—Charles D. Miller
*Attorney*—C. Cornell Remsen, Jr. et al.

[57] ABSTRACT

A transcoder is disclosed for exchanging time division multiplex data between a PCM system and a DM system. The basic circuit is a code circulation loop employing shift registers having a capacity for one PCM frame and wherein the codes are advanced by one address at each DM time slot. The DM clock is synchronized by the PCM clock.

2 Claims, 7 Drawing Figures

TRANSCODER FOR DATA EXCHANGES BETWEEN A DELTA MODULATION SYSTEM AND A PCM SYSTEM

The present invention concerns a PCM to DM and DM to PCM transcoder, said transcoder being designed to be associated to telecommunication systems operating in time division multiplex.

The expression "PCM" means "pulse code modulation."

The expression "DM" means "differential modulation" or "delta modulation."

If, for instance one considers a PCM telecommunication network, it might be connected to a DM network in the following cases:

1 — The subscriber sets are equipped with delta coders and are connected to a concentrator of the PCM network. Then it is necessary to make a PCM/DM transcoding in said concentrator.

2 — A junction connecting two PCM central exchanges uses a radio-link and it may be necessary to make a DM transmision.

The two systems are characterized by the following parameters:

— They have the same number m of time multiplex channels;

— The duration of a PCM repetition period or "PCM frame" is referenced TP;

— The duration of a DM frame is $TD = TP/k$, $k$ being an integer number. It results that a PCM code or a set of $k$ DM bits of value 0 or 1 are associated with a given channel $j$ in each PCM frame.

In the present invention, the basic circuit used for the DM to PCM conversion, and for the PCM to DM reverse conversion, is a "code circulation loop" containing m codes of a PCM frame. In the loop, the codes circulate at the rate of the delta bits, (the delta channel time slots), and the PCM code relating to the channel $j$ is modified with a periodicity of m delta channel time slots, i.e. once by a delta frame of duration TD and $k$ times by a PCM frame of duration TP.

In the DM to PCM transcoder, the bit received at each DM channel time slot controls the modification by one unit (plus or minus one unit) of the PCM code corresponding to this channel which is provided by the loop at the wanted time. As stated above, this "adjustment" of the PCM code is performed $k$ times during the PCM frame.

After this one PCM frame time interval, the modified PCM code is transmitted to the user but it also remains stored in the loop for the processing during the next PCM frame.

In the PCM/DM transcoder, two code circulation loops L$a$ and L$b$ are provided. In the loop L$a$, the PCM codes are progressively introduced as they arrive and they are compared, at each DM frame, to the homologous code read in the loop L$b$. According to the sign of the difference between the values of the two codes, the value of the code of the loop L$b$ is increased or decreased by one unit and a bit DM of value 1 or 0 is sent. The content of the loop L$b$ is permanently kept, while each code of the loop L$a$ is modified at each PCM frame.

The object of the present invention is therefore to achieve equipments for translating DM into PCM and inversely, said equipments being designed to be associated to time multiplex telecommunication systems.

According to the invention, there are provided means to store the $m$ $n$-bit codes of a PCM frame in a code circulation loop, comprising first $(m-1)$ shift register stages and second a register (or a counter), means to control the circulation of the codes in said loop so that a new code is transferred in the register (or the counter) at each delta channel time slot, the ratio between the duration of the PCM and delta frames being referenced $k$, the number $k$ being an integer and having no common factor with the number of channels, means to introduce and to extract PCM codes in said loop, said means receiving a control signal every $k$th delta channel time slot and clock means, driven by the input PCM signals, which control the synchronizing of the delta channel time slots with the times during which the corresponding PCM codes are stored in the register (or the counter).

According to another characteristic of the invention, there are provided, in the DM/PCM transcoder, means to store codes comprising a circulation loop with an up-down counter, means to modify the code contained in this counter at the reception of each delta bit, said code being increased (decreased) by one unit when the value of this bit is 1 (0) and means to extract a PCM code every $k$th delta channel time slot.

According to another characteristic of the invention, there are provided, in the PCM/DM transcoder, means to store codes comprising two circulation loops L$a$ and L$b$ comprising respectively a register and an up-down counter, means to introduce in the loop L$a$ the PCM codes received every $k$th delta channel time slot, means to compare the code CR contained in the register (loop L$a$) and the code CK contained in the counter (loop L$b$) at each delta channel time slot, means to modify the code contained in the said counter, said code being increased (decreased) by one unit when CR > CK (CR < CK) and means to transmit, at each delta channel time slot, a delta bit of value 1 if CR > CK.

Before describing the transcoders according to the invention, we will briefly review the principles of PCM (pulse code modulation) and DM (differential or delta modulation) modulations.

In both cases, the problem consists in transmitting digitally all the information contained in signals covering a frequency band limited to a value $f$ max. As is well known, this information is kept if the signals are sampled at a frequency $fs = 2 f$ max and if the amplitude of each sample is coded either in PCM or in DM.

If one admits that the peak-to-peak amplitude of the signals is E$c$ volts, the maximum difference of amplitude between two successive samples of a sinusoidal signal of a frequency $f$ max is equal to E$c$.

In a PCM coding with n bits, the amplitude of the unit quantizing step is $EQp = Ec/2^n$ but the coder is always designed to meet the constraint exposed in the previous paragraph.

On the other hand, in a DM coding wherein each sample is represented by the value of a single bit, one can only code a reduced amplitude variation EQP. It is therefore understood that the sampling frequency in DM will be $k$ times greater than in PCM to obtain performances suitable for the coding of periodical voltages.

Other objects, characteristics and advantages of the present invention will appear when reading the following description of an example of realization, said description being done in relation with the joined drawings in which:

FIGS. 1*a* and 1*b* represent the clock signal diagrams;

FIG. 2 represents the detailed diagram of the conversion clock;

FIGS. 3*a* and 3*b* represent the phase locking diagram of the clock signals HP and HO;

To make easy the reading of said description, this one will be divided as follows:

1 - Conversion clock;

2—DM/PCM transcoding;

3 — PCM/DM transcoding.

The table 1 hereunder gives the meaning of the different symbols used during the description.

TABLE 1 — Symbols used in the description

| Symbol | Meaning |
|---|---|
| *HP* | PCM clock |
| *TP* | Duration of a PCM frame |
| *m* | Number of channels in a PCM or DM frame |
| *W* | Duration of a PCM channel |
| *w*1, *w*2..*wm* | PCM channel time slots |
| *tp* | Duration of a PCM bit time slot |
| *fp* | PCM bit frequency |
| *n* | Number of bits in a PCM channel |
| *t*1, *t*2..*tn* | PCM bit time slot |
| *HD* | DM clock |
| *TD* | Duration of a DM frame |
| *td* | Duration of a DM channel time slot (bit time slot) |
| *fd* | DM bit frequency |
| *v*1, *v*2..*vm* | DM channel time slot |
| *k* | Ratio *TP/TD* |
| *a, b, c, d,* | Basic time slots dividing a DM channel time slot into four parts |
| *x* | Duration of one of these elementary time slots |
| *e,f* | Elementary time slots dividing a PCM bit time slot into two parts. |

1. Conversion Clock

The circuits, according to the invention, receive on one side the incoming PCM stream "PCM(*i*)" and on the other side the incoming DM stream "DM(*i*)". Regenerative repeaters, the realization of which is well known, deliver regenerated incoming signals "PCM(*r*)" and "DM(*r*)." The circuits provide the outgoing PCM "PCM(*o*)" and the outgoing CM "DM(*o*)."

By way of a non limitative example, it will be set that the regenerated PCM or "PCM(*r*)" controls a time base HP which is used as pilot time base for controlling the whole equipment. Therefore:

— The outgoing PCM "PCM(*o*)" is synchronized on this time base HP;

— The delta time base HD is synchronized on HP;

— The outgoing DM "DM(*o*)" is synchronized on HD and therefore on HP.

To achieve the complete synchronization PCM-DM, the time base of the signals DM(*i*) is adjusted on the time base HP through an adjustable delay circuit, as it has been described in the French Pat. No. 1,516,888.

The table 1 permits to establish easily the following relations :

$$m.n.tp = TP$$
$$m.td = TD$$
$$TP = k.TD$$
$$TP/TD = k = n.\ (tp/td)$$
$$tp/td = k/n \quad (1a)$$

$$fd/fp = k/n \quad (1b).$$

Figures 1A, 1B:
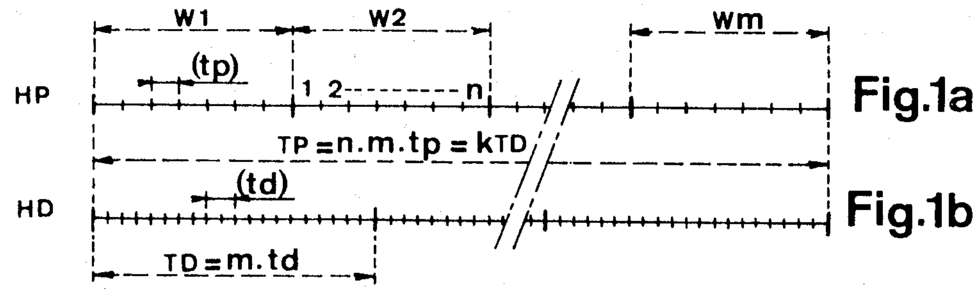

The FIGS. 1*a* and 1*b* represent the diagrams of signals of the time bases HP and HD.

On these diagrams, the durations, such as *tp* and *td*, have been written between brackets.

Figure 2:
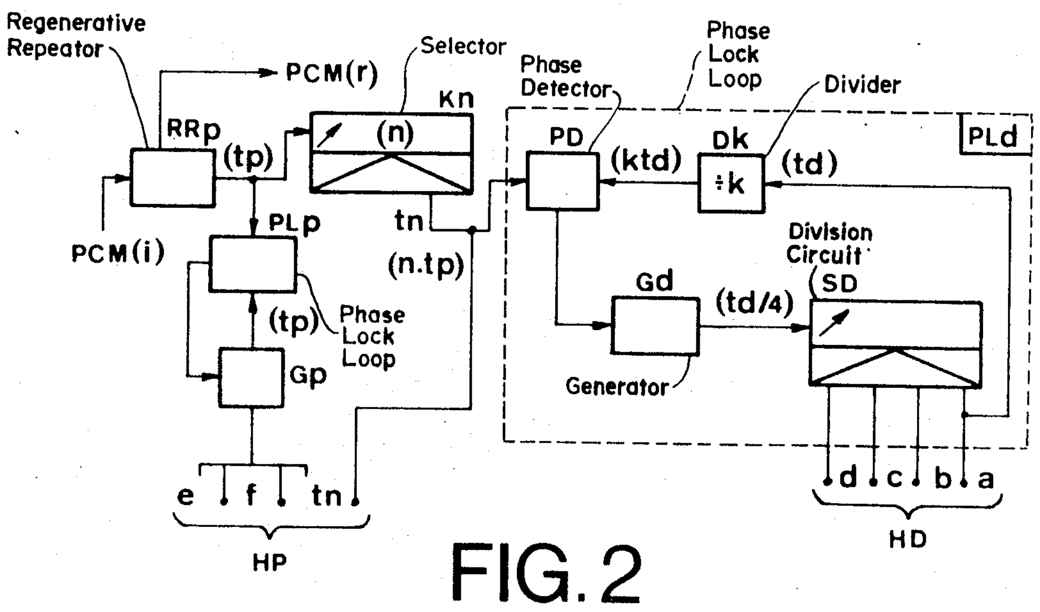

The FIG. 2 represents the detailed diagram of the conversion clock driven by the signals PCM(*i*). It comprises :

— The regenerative repeater RR*p* providing, on one hand, the signals PCM( *r*) and on the other hand, the signals of the time base HP at PCM bit frequency;

— The selector *Kn* comprising a counter having a capacity of *n* counts and a decoder , — The phase lock loop PL*p* providing the basic time slot signals *e* and *f* of the time base HP ;

— The phase lock loop PL*d* providing the basic time slot signals of the time base HD.

This loop PLD controls the synchronization of the time base HD on the time base HP by using the relation of the equation (1*a*).

As a matter of fact, the frequency of the signals provided by the repeater RR*p* is divided by n in the selector K*n* which delivers on its output *tn* signals of period *n.tp* which have the duration of a PCM channel time slot.

Moreover, the period of the signals applied to the divider DK is equal to *td*, so that this one supplies signals of duration *k.td*. The equation (1*a*) shows that these durations *n.tp* and *k.td* must be equal, which is materialized by their comparison in the phase detector PD. The error signal supplied by this one controls the frequency of the generator G*d* which feeds the divider D*k* through the division circuit SD in such a way that the error tends to be equal to zero.

The period of the signals provided by the generator G*d* is equal to *td*/4 and it is multiplied by four by the selector SD which feeds the divider D*k* and also provides the basic time slot signals *a, b, c, d* of the time base HD.

As has been seen above (see also the FIGS. 1*a* and 1*b*), at each PCM frame, there is a new code for each channel on the PCM side, whereas there are *k* bits on the delta side.

One therefore understands that, in the DM/PCM conversion for instance a PCM code must be transmitted every *k* DM channel time slots. If the DM channels are aligned in the natural order 1, 2 . . .*m*, the PCM codes are then transmitted modulo *k* which means in the order 1, 1+*k*, 1+2*k* etc . . .

One therefore understands that, for transmitting *m* codes corresponding to the *m* channels of a PCM frame, it is necessary that *k* and *m* have no common factors.

Thus, in the case when *m* = 24 and *k* = 7, the table 2 gives, when reading from left to right, and from top to bottom, the transmission order of the codes W1, W2 . . .W24.

TABLE 2 — Transmission order of the PCM codes

| | | | |
|---|---|---|---|
| W1 | W8 | W15 | W22 |
| W5 | W12 | W19 | |
| W2 | W9 | W16 | W23 |
| W6 | W13 | W20 | |
| W3 | W10 | W17 | W24 |
| W7 | W14 | W21 | |
| W4 | W11 | W18 | |

By way of a non limitative example, transcoding circuits for PCM and DM systems presenting the following characteristics will be described :

$$m = 24$$

$$n = k = 7$$

Figures 3A, 3B:
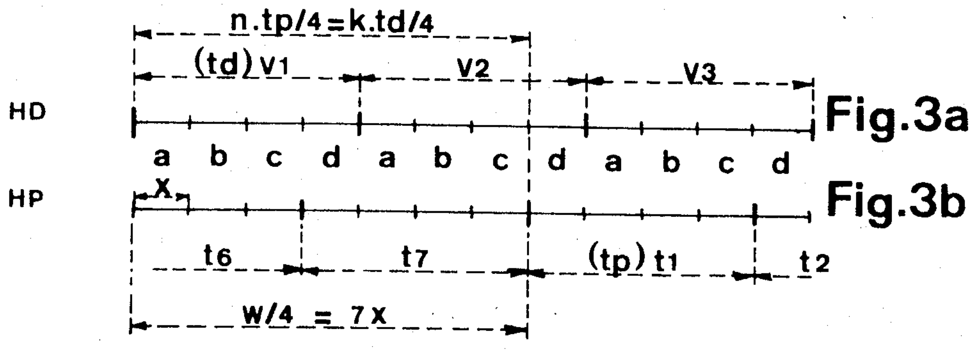

The FIGS. 3*a* and 3*b* represent, in this case, the diagrams of signals HD and HP on which the durations are written between brackets.

One will notice that $tn = t7$

As $n = k$, we have $tp = td$ and each delta channel time slot (FIG. 3*a*) is divided into four basic time slots *a*, *b*, *d*, *c*.

As it has been seen when describing the FIG. 2, the time bases HP and HD are synchronized by the phase lock loop PL*d* and it is supposed that the phase detector PD is realized so that it locks the signals of period $n.tp$ (PCM channel time slots) in phase quadrature with HP lagging by $W/4$ with respect to HD.

As $k.tp = 28x$, $W/4 = 7x$. One sees thus on the FIG. 3*b*, that a PCM bit time slot is divided into four elementary time slots *d*, *a*, *b*, *c*.

2. DM/PCM transcoding

Figure 4:
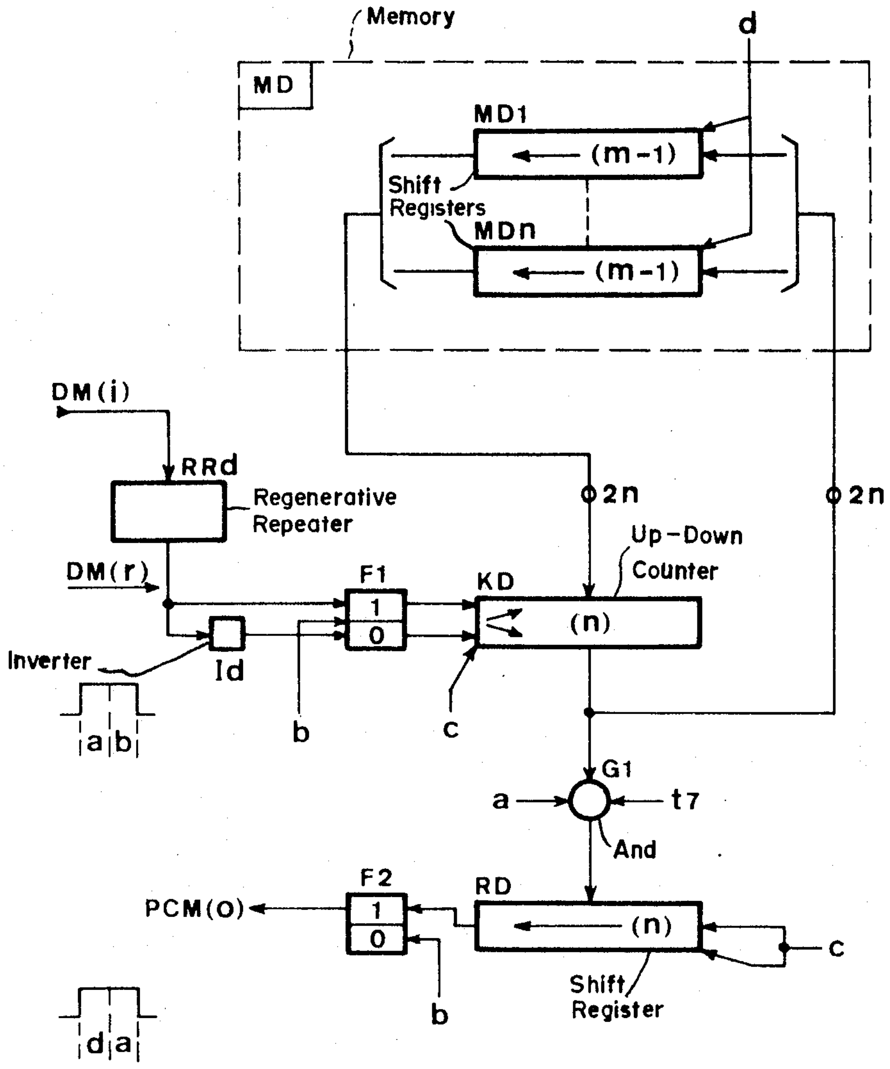
FIG. 4 represents the detailed diagram of the DM/PCM transcoder.

The FIG. 4 represents a detailed diagram of equipment used for the DM/PCM transcoding which comprises :

— A memory MD having a capacity of $(m-1)$ $n$-bit words. This memory is made up by the association of the shift registers MD1 to MD*n*. On this figure, one has represented registers, the advance of which is controlled by a single basic time signal (the signal *d*). The leading edge of this signal controls the transfer, in the first stage, of the information presented on the input and its trailing edge controls the reading of the information written in the last stage. Such registers are currently available, either in MOS technology (static shift registers), or in TTL technology. One understands that it would be possible to use dynamic shift registers realized in MOS technology and which need two distinct advance signals, by increasing the number of basic time slots provided by the loop PLd, FIG. 2.

— The Up-Down counter KD and its control flip-flop F1.

The memory MD and the Up-Down counter KD are connected in a code circulation loop containing the *m* codes of a PCM frame. This interconnection comprises two wires per bit, so that it is not necessary to provide a "clear" control for the counter KD.

— The regenerative repeater RRd receiving the DM signals referenced "DM(*i*)" and providing the regenerated signals "DM(*r*)." These signals are directly applied to the 1 input of the flip-flop F1 and to the 0 input of said flip-flop through the invertor I*d*.

— The *n*-bit shift register RD wherein a PCM code to be transmitted is transferred, in parallel form, at each PCM channel time slot and which provides the parallel to series conversion of said code. This register is similar to those used in the memory MD.

— The flip-flop F2 which reshapes signals to be transmitted on the output PCM(*o*).

This equipment operates in the following way, assuming —as shown on the figure— that the repeater RRd provides signals covering the basic time slots *a* and *b*.

At each time slot *d*, a clock signal applied to the registers of the memory MD controls the advance by one position of the codes which are stored therein so that the code stored in KD is transferred to the first stage of each register of MD and that the one stored in the last stage of these registers is transferred to KD.

At the next time slot *b*, if a delta bit of value 1 (0) is received, the flip-flop F1 is set in the 1 (0) state and, at the time slot *c*, the content of KD is increased (decreased) by one unit, i.e., the code is adjusted according to the value of the received delta bit.

As has been seen at the end of the previous paragraph, a PCM code has to be transmitted every *k*th DM channel time slot. The maximum adjustment delay of the PCM code is therefore of *k* DM channel time slots.

This transmission is controlled by the AND circuit G1 which is activated once every PCM channel time slot for the logic condition $t7.a$. The code written in KD is then transferred into the shift register RD which receives an advance signal at each time *c*.

As in this register, the reading of the information stored in the last stage is controlled by the trailing edge of the clock pulse and this information is stored at the time *d* in F2. This flip-flop being reset to the 0 state at the time *a*, the signals PCM(*o*) cover the time slots *d* and *a*.

3. PCM/DM transcoding

Figure 5:
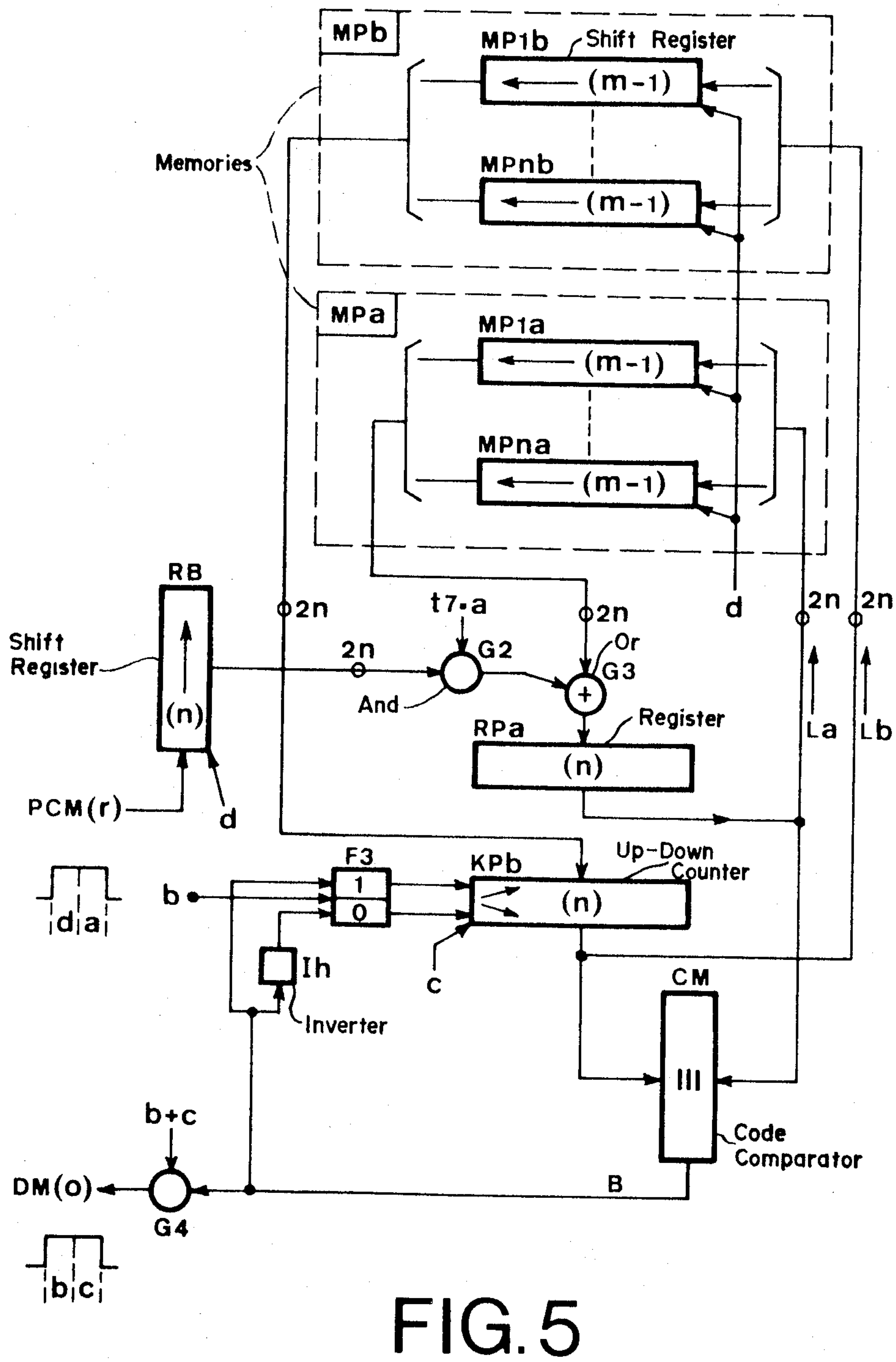
FIG. 5 represents the detailed diagram of the PCM/DM transcoder.

FIG. 5 represents a detailed diagram of the equipment used for the PCM/DM transcoding which comprises :

— The code circulation loop La comprising the memory MP*a* identical to the memory MD of the FIG. 4 (*n* shift registers MP1*a* . . .MP*na* comprising each $m-1$ stages) and the register RP*a* having a capacity of *n* bits.

— The code circulation loop L*b* comprising the memory MP*b* identical to MP*a* and the Up-Down counter KP*b*.

— The delta adjustment circuit comprising the JK flip-flop F3 and the inverter I*h*.

— The code comparator CM providing, on its output B, a signal when the value of the code stored in RP*a* is greater than that of the code stored in KP*b*.

— The *n*-bit shift register RB wherein the PCM bits delivered in series by the repeater RR*p* (FIG. 2) are introduced as soon as they are received.

To describe the operation of this equipment, it is noted that :

*a*. The repeater RRp (FIG. 2) delivers signals "PCM(*r*)" covering the elementary time slots *d* and *a* ;

*b*. The PCM time base comprises a synchronizing circuit which controls the counter K*n* (FIG. 2) so that a signal $tn = t7$ coincides with the time of reception of the seventh bit of a PCM code. Such circuits are well known and have been described, for example in the French Pat. No. 1,518,764.

The PCM regenerated bits, PCM(*r*), are introduced in the register RB at the time *d*. When this one contains the seven bits of a code, the time base HP delivers a signal $t7$ and the logic condition $t7.a$ activates the gate G2 allowing the transfer of the code in parallel form -and through the OR circuit G3- to the register RP*a*.

Each loop L$a$ and L$b$ works as the one described in the FIG. 4 and a PCM code read in the corresponding memory is transferred in RP$a$ and KP$a$ at the end of the elementary time $d$ of each delta channel time slot. The code in the loop L$a$ (code CR written in RP$a$) is modified once every PCM channel time slot by the transfer of the code stored in RB (AND circuit G2). This transfer being allowed during the whole time $a$, the new code erases the one read in MP$a$ at the end of the preceeding time $d$, that is to say at the beginning of the said time $a$.

The code CR stored in RP$a$ and the code CK stored in KP$b$ are continuously compared in the comparator CM whose output signal B is applied to the delta adjustment circuit. The result of the comparison is stored in the flip-flop F3 at each time $b$, this one being set in the 1 (0) state when CR > CK (CR ≤ CK).

At the next elementary time $c$, the value of the code CK is increased or decreased by one unit according to the state of F3.

The signal B also provides the output signals "DM($o$)" which are reshaped by the AND circuit G4 on during the time slots $b$ and $c$.

In summary, one sees that the loop L$a$ contains the new PCM codes received with a periodicity of $k$ delta channel time slots, and that the loop KP$b$ contains the PCM codes which are being adjusted.

The available time for this adjustment operation is $k$ delta channel time slots. At each delta channel time, a pulse is transmitted on the output DM($o$) if the adjusted code CK is smaller than the new code and no pulse is transmitted if the code CK is greater or equal to the new code.

Whereas the present invention has been described in connection with a particular example of realization, it is to be clearly understood that it is not limited to the said example and that it is likely to present other variations or modifications without going beyond its scope.

We claim:

1. A transcoder for exchanging data bet between a telecommunications system operating in differential modulation (DM) with a repetition rate of duration $TD$ and a telecommunication system operating in pulse code modulation (PCM) with a repetition rate of duration $TP = k.TD$, $k$ being an integer number greater than one and having no common factor with the number of channels $m$, said systems including $m$ time multiplex channels and the PCM codes including $n$ bits each, said transcoder comprising:

a code circulation loop of capacity to contain the $m$ channels of a PCM frame, said loop including a first memory including n shift registers with $(m-l)$ stages each, and a second memory including an Up-Down $n$-bit counter;

means interconnecting the registers and the counter, the registers and the counter each receiving advance signals so that, at each DM channel time slot, the first bit of the $n$-bit code stored in the counter is transferred into the first stage of each shift register and the $n$-bit code stored in the $(m-1)$th stage of each register is transferred into the counter;

means for modifying the code stored in said counter by one unit at the reception of each bit coming from the DM system, said code being increased (decreased) by one unit when the value of this bit is 1 (0) and the PCM code is extracted from the loop every $k$th delta channel time slot and transmitted towards the PCM system the number $k$ having no common factor with the number of channels $m$.

2. A transcoder as claimed in claim 1, including a second code circulation loop identical to that according to claim 1;

means for introducing the codes received from the PCM system, with a periodicity of $k$ DM channel time slots, into a register in the second loop, means for comparing the code CR contained in the second register with the code CK contained in the counter, said comparison providing a signal B when CR>CK;

means providing when a signal B($\bar{B}$) is elaborated at a delta channel time slot, the content of the counter is increased (decreased) by one unit and a bit is transmitted to the DM system at each delta channel time slot during which a signal B is elaborated.

* * * * *